Patented Nov. 18, 1952

2,618,531

UNITED STATES PATENT OFFICE 2,618,531

METHOD OF PURIFYING ZIRCONIUM TETRACHLORIDE VAPORS

Robert Hugo Lindblad and Sven Christian Pyk, Nynashamn, Sweden

No Drawing. Application September 26, 1949, Serial No. 117,950. In Sweden June 21, 1948

7 Claims. (Cl. 23—87)

The present invention relates to a method of producing pure zirconium tetrachloride, either by the direct chlorination of zirconium raw materials containing iron, chromium and other metals or by purifying zirconium tetrachloride containing chlorides of said other metals as impurities.

It is known that zirconium tetra-chloride containing ferric chloride such as is generally obtained by the hitherto known processes, cannot be purified from the latter solely by fractional sublimation, due to the fact that the zirconium tetra-chloride and the ferric chloride both have substantially the same vapour pressure.

In order to separate and purify the zirconium tetra-chloride from the ferric chloride it has been proposed to first reduce the ferric chloride included in the product to the less volatile ferrous chloride with hydrogen when the zirconium chloride remains to a great extent unchanged, and the two components can then be separated to a certain degree by simple sublimation. However, it has been found that a complete purification of the zirconium tetrachloride cannot be obtained in this manner. The limit for the reducing capacity of hydrogen corresponds to a content of iron compound of about 0.2%, calculated as iron, in the zirconium tetrachloride obtained by sublimation at ordinary sublimation temperature. At higher temperatures the reducing action of the hydrogen is increased, and on account hereof the zirconium tetrachloride also begins to be reduced to more volatile zirconium chlorides so that the yield of pure zirconium tetrachloride is considerably reduced.

According to the present invention the above-mentioned disadvantages may be eliminated by carrying out the sublimation of the chlorinating products in the presence of certain reducing metals which are capable of reducing ferric chloride and the higher chlorides of other contaminating metals present to lower chlorides which are less volatile than the zirconium tetrachloride. Examples of suitable reducing metals for this purpose are zinc, cadmium, and manganese which may be used each per se or in mixture with each other. It has been shown in a surprising manner that hereby the zirconium tetrachloride can be separated practically completely from the impurities owing to the fact that the reduction of the latter can proceed sufficiently without the zirconium tetrachloride being affected thereby. Consequently, the process according to the invention not only results in a pure final product which is practically free from iron compounds etc. but also increases the yield of the zirconium tetrachloride in a remarkable manner.

For producing pure zirconium tetrachloride directly from a zirconium raw material containing iron, for instance iron-containing zirconium metal or iron-containing zirconium carbide, said zirconium raw material may be subjected to a chlorination, say at a temperature of about 300–400° C. According to the invention the process is conducted in such a way that all the chlorine reacts with the initial material subjected to chlorination, of which there must therefore be a surplus present. The chlorination products formed, which are consequently free from chlorine, are then sublimated into a zone containing a reducing metal as mentioned above, such as zinc, where the vapours of the chlorine compounds are passed in contact with said reducing metal whereby ferric chloride present in the vapours is reduced to ferrous chloride, which does not volatilise with the zirconium tetrachloride. Due to the absence of free chlorine in the chlorination product to be sublimated, on the one hand the zinc is prevented from being attacked by the chlorine, and on the other hand the reforming of ferric chloride by the reaction between the ferrous chloride and the chlorine is obviated. Consequently, a pure zirconium tetrachloride sublimates and may be collected.

Instead of already produced zirconium carbide also a mixture of zirconium oxide and carbon may be subjected to reduction and chlorination at a temperature of about 700–800° C., and then purified as described above.

The reducing metals employed for the purification of the zirconium tetrahalogenides according to the present invention may be used in different manners. In case of purifying impure zirconium tetrachloride already produced, said reducing metals, such as zinc, may be added to the impure zirconium halogenide, preferably in the form of powder or grains. According to another advantageous manner of working the vapours of the impure product to be sublimated are allowed to pass through a layer of zinc that is granulated or distributed in some other form, or through zinc spirals or between zinc plates or in some other manner to allow the vapour to come into as close contact as possible with the zinc.

On reduction in the described manner, zinc chloride will, of course, also be formed. Since, however, the vapour pressure of zinc chloride is only about a ten-thousandth part of the vapour pressure of zirconium tetrachloride for example, no appreciable contamination of the product can be caused by the zinc. Thus, even with a simple sublimation, the zinc chloride content of the purified zirconium tetrachloride will be particularly low. From the difference in vapour pressure referred to above it can be calculated that said zinc chloride content will amount to at a maximum 0.003 per cent by weight of the product. Further, the vapour pressure of the ferrous chloride is only about one-hundredth part of the vapour pressure of zinc chloride, and after complete conversion and the establishment of an equilibrium, the iron content of the product can therefore be calculated to be as low as about 0.00005 per cent by weight.

By using fractional sublimation still further purification can be obtained, if desired.

The combined reduction and sublimation of the impure zirconium tetrachloride product according to the invention can be carried out most simply at atmospheric pressure. Thus, for example, the sublimation occurs at 330° C., and at the same time the reaction between the ferric chloride and zinc takes place extremely rapidly and completely.

The process may also be carried out at lower temperatures, in which case the vapour pressure of the components may be supplemented by an inert gas, such as carbon dioxide. The rate of sublimation is then determined by the quantity of inert gas passing through the zirconium tetrachloride to be sublimated in a given unit of time.

The apparatus used for carrying out the process of the invention may be constructed of iron, since iron is inert to zirconium tetrachloride at the temperature prevailing when carrying out the process. Ceramic material such as glass, porcelain, or refractory brick is, however preferable.

Example 1

Chlorine was introduced into a surplus of zirconium carbide at 400° C., and the zirconium chloride formed was sublimated, partly directly and partly through spirals of sheet zinc. The zirconium chloride which was passed through the zinc spirals exhibited an iron content of 0.002% (that is a content of iron compounds corresponding to 0.002%, calculated as iron), whilst the part that was sublimated without passing through the zinc spirals had an iron content of 0.40%. When using manganese in granular form in place of the sheet zinc, an iron content of 0.03% was obtained in the purified product.

Example 2

Impure zirconium tetrachloride containing 1.1% iron was mixed with about three times the quantity of zinc which had been required for the reduction of ferric chloride to ferrous chloride, or with about 2% zinc in granulated form. The mixture was heated for two hours in a weak stream of carbon dioxide in a fireclay tube at 300–330° C. The sublimated product contained 0.01% iron.

Example 3

The quantity of zinc according to Example 2 was increased to 10%, calculated on the impure zirconium tetrachloride, whereupon the process was carried out in the same manner as in the said example. The sublimated product contained 0.001% iron.

Example 4

Impure zirconium tetrachloride of the same kind as in Examples 2 and 3 was sublimated at the same temperature without the addition of zinc, but the vapour to be sublimated was led through spirals of sheet zinc which were also heated up to the sublimation temperature of about 330° C. The purified product contained less than 0.001% iron.

Example 5

Cadmium powder was mixed with the impure zirconium tetrachloride. In other respects the process was carried out in accordance with Example 2. The purified product contained 0.03% iron.

In all cases the yield, calculated on the zirconium, was about 98%. The loss may be attributed to the approximate quantity of 2% zirconium which in the form of less volatile zirconium oxy chloride was included in the impure zirconium tetrachloride. This may be seen from the fact that the same yield of zirconium tetrachloride, although in impure form, was obtained for zirconium when sublimation was carried out in the absence of zinc, in which case, of course, no reduction could occur.

The process according to the invention may also be carried out with advantage when employing a temperature which exceeds the melting point of zinc so that the zinc is present in a molten form, and the vapours to be purified may in this case be passed through a separate reaction vessel with the molten zinc.

From the pure zirconium tetrachloride obtained according to the invention, lower chlorides can, of course, be produced by reduction in a manner known per se.

Although the invention in the above-mentioned examples has been described especially with regard to the purification of zirconium tetrachloride preferably with the aid of zinc, it is by no means restricted hereto.

We claim:

1. A process for producing pure zirconium tetrachloride from zirconium raw materials containing, in addition to zirconium, impurities of iron and chromium; which comprises chlorinating the said zirconium raw material at a temperature within the range of from about 300° to 400° C., thus producing sublimated vapors of zirconium tetrachloride mixed with iron and chromium chloride impurities, passing a stream of these vapors in the absence of free chlorine within the same temperature range in direct surface contact with a metal of the group consisting of zinc, cadmium and manganese, thereby reducing the chloride impurities and rendering them non-volatile without substantial reduction of the zirconium tetrachloride and directly thereafter recovering zirconium tetrachloride from the so-purified stream of vapors.

2. The process of claim 1 wherein the chlorination step is conducted with the zirconium raw material in excess whereby the sublimated vapors are substantially free from chlorine.

3. The process of claim 1 wherein said zirconium raw material comprises zirconium carbide with impurities of iron and chromium carbides.

4. A process for recovering pure zirconium tetrachloride from a raw material containing zirconium oxide with impurities of iron and chromium oxides, which comprises mixing said raw material with carbon, chlorinating the mixture at a temperature of from about 700° to 800° C., to produce vapors containing zirconium tetrachloride and impurities of iron and chromium chlorides, passing a stream of the resulting vapors in the absence of free chlorine in direct surface contact with at least one metal of the class consisting of zinc, cadmium and manganese, at a temperature of from about 300° to 400° C., whereby the chlorides of iron and chromium are reduced and rendered non-volatile without substantial reduction of the zirconium tetrachloride, and directly thereafter recovering zirconium tetrachloride from the so-purified stream of vapors.

5. A process of purifying the vapors of zirconium tetrachloride containing ferric chloride as an impurity which comprises passing a stream of these impure vapors in the absence of free chlorine, at a temperature above 300° C. but below the sublimation temperature of ferrous chloride, in direct surface contact with at least one reducing agent, selected from a class consisting of metallic zinc, cadmiun and manganese, and directly thereafter recovering the so-purified zirconium tetrachloride from the so-purified stream of vapors.

6. The process of claim 5 wherein the impure zirconium tetrachloride is sublimated while mixed with the said reducing metal.

7. The process of claim 5 wherein the impure zirconium tetrachloride is sublimated before being contacted with the said reducing metal.

ROBERT HUGO LINDBLAD.
SVEN CHRISTIAN PYK.

REFERENCES CITED

The following references are of record in the file of this patent:

FOREIGN PATENTS

| Number | Country | Date |
| --- | --- | --- |
| 466,705 | Great Britain | June 2, 1937 |
| 487,834 | Great Britain | June 22, 1938 |
| 551,525 | Great Britain | Feb. 26, 1943 |

OTHER REFERENCES

Mellor's, "A Comprehensive Treatise on Inorganic and Theoretical Chemistry," vol. 7, pp. 143-144. Longmans, Green & Co., N. Y.

"Handbook of Chemistry and Physics," 28th ed., pp. 490-491, by C. D. Hodgman. Chemical Rubber Publishing Co., Cleveland.

"Zeitschrift fur anorganische und allgemeine Chemie," Band 128, 1923, pages 96-99; article by Ruff and Wallstein on the Reduction of $ZrCl_4$.